US007904459B2

(12) United States Patent
Grigsby et al.

(10) Patent No.: US 7,904,459 B2
(45) Date of Patent: Mar. 8, 2011

(54) GENERATING A RECIPIENT LIST FOR PROPAGATING CONTACT INFORMATION CHANGES BASED ON CONTACT METRICS INVOLVING A USER AND THE RECIPIENTS ON THE LIST

(75) Inventors: Travis M. Grigsby, Austin, TX (US); Mark R. Hufnagel, Morrisville, NC (US); Tyler S. Lacock, Morrisville, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/051,306

(22) Filed: Mar. 19, 2008

(65) Prior Publication Data

US 2009/0240657 A1 Sep. 24, 2009

(51) Int. Cl.
*G06F 17/30* (2006.01)

(52) U.S. Cl. ........................................................ 707/740

(58) Field of Classification Search .................. 707/613, 707/665, 736, 740

See application file for complete search history.

(56) References Cited

U.S. PATENT DOCUMENTS 6,400,810 B1 * 6/2002 Skladman et al. ......... 379/93.24
6,701,348 B2 3/2004 Sommerer
6,883,000 B1 * 4/2005 Gropper ................................ 1/1
6,909,910 B2 6/2005 Pappalardo et al.
6,973,299 B2 12/2005 Apfel
6,988,129 B2 1/2006 Quine
7,715,546 B2 * 5/2010 Pagel et al. .............. 379/265.02
2002/0016857 A1 * 2/2002 Harari ........................... 709/238
2003/0086402 A1 * 5/2003 Yang ............................. 370/338
2004/0128151 A1 * 7/2004 Mock et al. ....................... 705/1

(Continued)

FOREIGN PATENT DOCUMENTS

WO 02/082319 A1 10/2002

OTHER PUBLICATIONS

Day, M., "Instant Messaging/Presence Protocol Requirements", The Internet Society, RFC 2779, Feb. 2000.

*Primary Examiner* — James Trujillo
*Assistant Examiner* — Jorge A Casanova
(74) *Attorney, Agent, or Firm* — Patents on Demand, P.A.; Brian K. Buchheit; Scott M. Garrett

(57) ABSTRACT

A change in contact information for a communicator can be identified. Contact metrics can be acquired for the communicator. The contact metrics can specify details of communications between the communicator and at least one other party. At least one previously established programmatic rule can be applied to the acquired contact metrics to automatically determine whether each of the parties is a recipient who should be notified of the change in contact information based upon comparing the contact metrics relating to that party and the communicator against at least one previously established threshold. Recipients can be selectively added to a recipient list based upon results of the applied programmatic rule. The recipient list can represent a listing of parties who are to be notified of the change in contact information.

19 Claims, 3 Drawing Sheets

300

Communication client sends an information update request to contact management server 302

Contact management server prepares a report of contacts and their communication history and conveys it to the communication client 304

The report is conveyed to the communication client, where the user can then select which action to take for each contact 306

The user's selections are conveyed to the contact management server 308

The contact management server deletes the contacts marked for deletion 310

The contact management server conveys the updated information to the communication devices for each contact to the be updated 312

U.S. PATENT DOCUMENTS

2004/0203598 A1 10/2004 Aerrabotu et al.
2005/0091272 A1* 4/2005 Smith et al. ................ 707/104.1
2005/0130631 A1* 6/2005 Maguire et al. ............ 455/414.1
2005/0131677 A1* 6/2005 Assadollahi .................. 704/201
2005/0157858 A1* 7/2005 Rajagopalan et al. ..... 379/93.23
2006/0224675 A1 10/2006 Fox et al.
2007/0021111 A1* 1/2007 Celik ............................ 455/418
2007/0046456 A1* 3/2007 Edwards et al. ........... 340/539.1
2007/0106698 A1* 5/2007 Elliott et al. .................. 707/200
2008/0162649 A1* 7/2008 Lee et al. ...................... 709/206

* cited by examiner

200

Recipient List Update Interface 202

| Contact 204 | Communication Frequency 206 | Action 208 |
| --- | --- | --- |
| Andrew Waters | Details | Update / Delete / **Ignore** |
| Victoria Ridgeway | Details | **Update** / Delete / Ignore |
| Jason Matthews | Details | Update / **Delete** / Ignore |

Update Cancel

Communication Frequency Details Interface 220

Contact: 222 Victoria Ridgeway

Last Communication: 224 Incoming Phone Call (10/19/2002 17:52)

Total Incoming Communications: 226 52

Total Outgoing Communications: 228 12

OK

Recipient Determination Configuration Interface 240

Automatically select contacts for deletion if there hasn't been a communication with via [Any] within the last [30] [days] 242

Automatically select contacts for deletion if I haven't contacted them via [Phone] within the last [2] [weeks] 244

Automatically select contacts for update if we have communicated via [Any] within the last [16] [hours] 246

Update Cancel

FIG. 2

GENERATING A RECIPIENT LIST FOR PROPAGATING CONTACT INFORMATION CHANGES BASED ON CONTACT METRICS INVOLVING A USER AND THE RECIPIENTS ON THE LIST

BACKGROUND OF THE INVENTION

The present invention relates to the field of contact management, more particularly, to generating a recipient list for propagating contact information changes based on contact metrics involving a user and the recipients on the list.

Users of such services as email, post, IM (instant messaging), phone, and the like commonly build up a list of contacts over time. This list of contacts can be records of other users' contact information that are kept in touch with over these mediums. Over time, some contacts can become obsolete (i.e., the user no longer keeps in touch, or the contact information has changed). Some situations can cause a user to change their contact information, causing their contacts to have outdated information. Such situations can include changing their phone number, switching service providers, changing their email address, moving residences, or the like. It can therefore be important for a person having changed contact information to convey this change to those communicators whom they wish to remain in contact with.

Current solutions to this problem can involve sending a mass communication (e.g., an email to all contacts, an IM Notification to everyone in a contact list, a text message to a group of people, generating a postal letter and sending it to all address book contacts using a mass mailing feature of a word processing program, etc.) to all of the contacts in a contact list. Sometimes artifacts such as VCARDS are conveyed within the mass communication to make it easier for a communication recipient to update the communicated contact information.

Determining a set of people based solely upon a presence or absence in a contact list is, however, a somewhat flawed approach, since a contact list often contains obsolete contacts and/or does not contain other people who are often in contact with the communicator. Overcoming these shortcomings requires extensive manual grooming of a contact list before updated contact information is sent, which many users lack the time or the inclination to perform. An automated approach yielding more accurate results that assists a user in determining a set of people who are to be sent contact information updates would be very useful.

BRIEF SUMMARY OF THE INVENTION

One aspect of the present invention can include a method, computer program product, system, and/or device for determining parties who are to receive contact updates. A change in contact information for a communicator can be identified. Contact metrics can be acquired for the communicator. The contact metrics can specify details of communications between the communicator and at least one other party. At least one previously established programmatic rule can be applied to the acquired contact metrics to automatically determine whether each of the parties is a recipient who should be notified of the change in contact information based upon comparing the contact metrics relating to that party and the communicator against at least one previously established threshold. Recipients can be selectively added to a recipient list based upon results of the applied programmatic rule. The recipient list can represent a listing of parties who are to be notified of the change in contact information.

Another aspect of the present invention can include a system for propagating contact updates that includes a history data store and a recipient list generator. The history data store can store communication history information for a user. The recipient list generator can automatically generate a list of recipients who are to receive a notification when a change to contact information for the user occurs. The recipient list generator can determine which recipients are to be included in the recipient list based upon the communication history information.

BRIEF DESCRIPTION OF THE SEVERAL VIEWS OF THE DRAWINGS

FIG. 2 is a diagram of a set of interfaces for managing contact metrics for propagating contact changes to known contacts in accordance with an embodiment of the inventive arrangements disclosed herein.

DETAILED DESCRIPTION OF THE INVENTION

Figure 1:
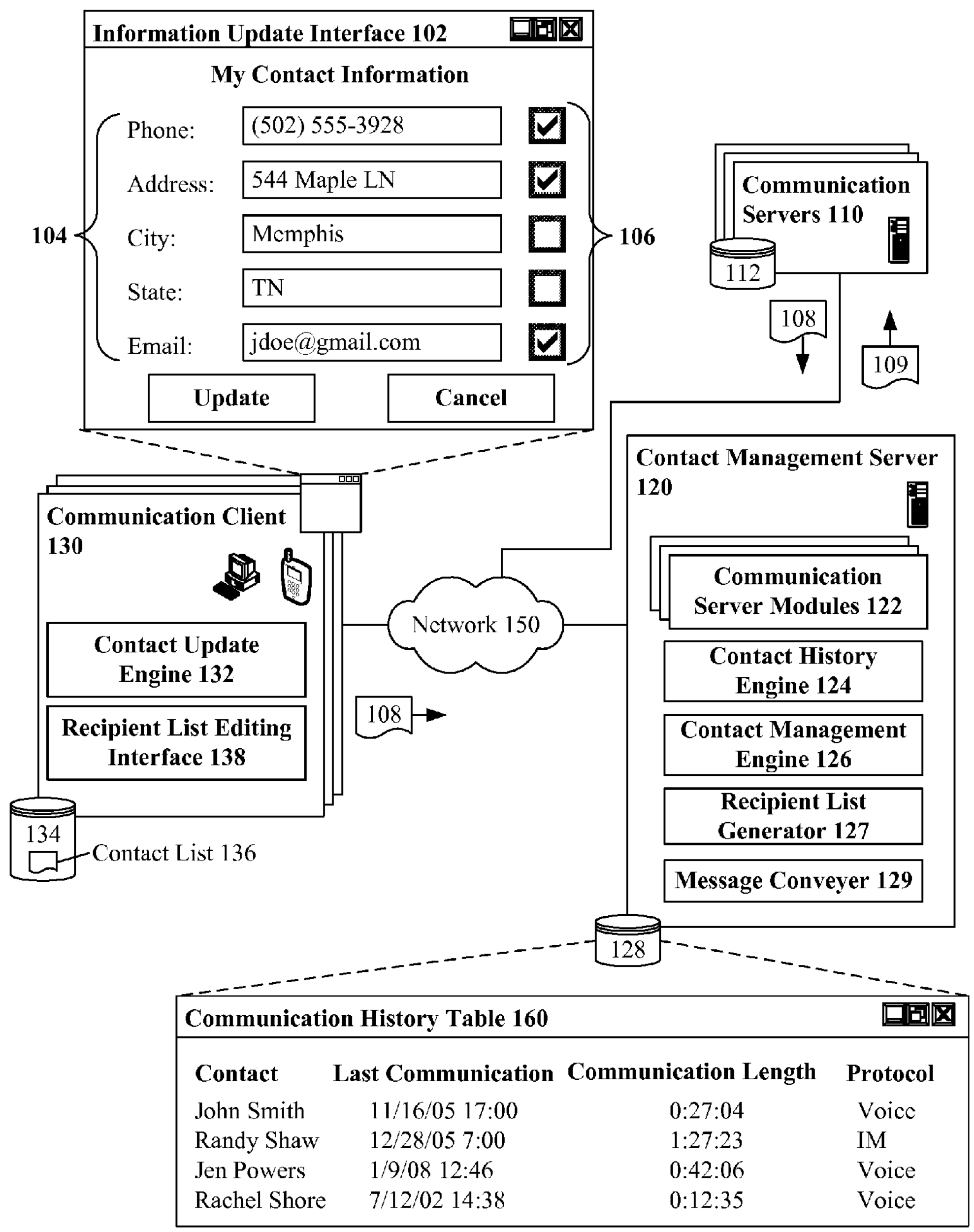
FIG. 1 is a schematic diagram of a system for automatically generating a list of recipients to who updated contact information of a sender is to be propagated based on contact metrics in accordance with an embodiment of the inventive arrangements disclosed herein.

The current invention can generate a recipient list of communicating parties who are to receive updated contact information from a sender based upon a set of configurable contact metrics, such as a communication history maintained by a sender's device or by a sender's communication service. Contact metrics can include any set of related contact information used to determine the likelihood of the contact being obsolete or of a communication not contained in a contact list being important. Contact metrics can include any kind or amount of information including, but not limited to, contact frequency, last communication date, last communication length, total number of incoming and outgoing communications, and the like. The generated recipient list can be a groomed or edited by a user after being generated. In one embodiment, the communications analyzed can span multiple different communication services or types, such as email, instant messaging, postal correspondence, phone communications, and the like.

In one embodiment, the generated recipient list can be linked to a communication program that facilitates a conveyance of a communication to each member of the recipient list. The recipient list can include one or more recipient identifiers suitable for a type of communication that the communication program uses to convey a message to the recipient. For example, email addresses can be used to identify recipients who are to receive a communication via email, Instant Messaging (IM) identifiers can be used to identify recipients who are to receive an IM, user identifiers can be used to identify a set of intranet users who are to receive a notification through an intranet server, phone numbers can be used to identify recipients who are to be automatically called using an automated phone service, postal addresses can be used to identify recipients who are to be conveyed messages through a mail merge program, and the like.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for automatically generating a list of recipients to who updated contact information of a sender is to be propagated based on contact metrics in accordance with an embodiment of the inventive arrangements disclosed herein. Contact metrics can refer to any data pertaining to historic communications between the sender, whose contact information has changed, and to parties (recipients of the updates) with whom the sender has communicated. In one embodiment, the sender can configure settings based upon the metrics to customize a creation of the recipient list.

In system 100, a sender's (user of client 130) contact information can change, which can be optionally detected automatically by contact update engine 132. For example, a user can use an interface 102 to change their contact information 104, such as phone number, address, email, and the like. Enablement options 106 can determine which, if any, of the updated fields 104 are to trigger the contact update engine 132 to propagate the updated information to a set of recipients.

A contact management server 120 can use a recipient list generator 127 to automatically generate a list of recipients who are to receive the updated contact information. The recipient list can be based at least in part upon contact metrics 108, which can be provided by client 130 and/or one or more communication servers 110. These contact metrics 108 can be stored in a data store 128, as shown by table 160. The recipients included in a recipient list are those recipients whom a user of client 130 has communicated with in the past. The recipients of the list produced by generator 127 can include parties outside the contact list 136 of client 130 and can exclude parties contained in the contact list 136 based upon the contact metrics 108. In one embodiment, the rules and thresholds that determine whether a contact (which can involve programmatic actions by engines 124-126) is to be included in the recipient list can be configured by the sender (user of client 130). Additionally, a recipient list generated by generator 127 can be presented within a recipient list editing interface 138 so that a user of client 130 can edit the automatically determined recipients of the contact updates.

Once a recipient list has been finalized, one or more messages can optionally be constructed that are to be delivered to the set of recipients included in the recipient list. A message conveyor 129 component of server 120 can generate a set of message commands 109, which are conveyed to one or more communication servers 110. The commands 109 can cause one or more recipients on the communication list to receive the updated contact information through one or more communication mechanism.

It should be appreciated that system 100 shows a client-server embodiment for generating the recipient list, where a contact management server linked to client 130 and communication servers 110 via network 150 is responsible for generating the list based upon contact metrics, such as data of a communication history table 160 maintained in data store 128. The embodiment shown in system 100 can be optionally implemented in middleware and can optionally utilize contact metrics from multiple different communication servers 110 and multiple different communication types (email, phone, chat, and the like). Further, communications can occur using one or more communication clients 130 of a common user. When multiple clients 130 are considered, contact lists 136 from each of these clients 130 can be merged and analyzed by the contact management server 120 when generating a recipient list.

Other implementations are contemplated and the invention should not be construed as limited to arrangements shown. In one embodiment, for example, the recipient list can be generated by communication client 130 in a stand-alone fashion based upon communication history information, contact list 136 information, and other information available to client 130. In another embodiment, the recipient list can be generated by a communication server 110 based upon contact metrics 108 available to that server.

As used herein, contact metrics can include any kind or amount of information including, but not limited to, frequency of incoming communications, frequency of outgoing communications, date and/or time of the last communication, last communication length, total number of incoming and outgoing communications, the communication mediums used, and the like.

The communication servers 110 can be any number of server or cluster of servers that can provide a communication service for a communication device, such as communication client 130. Communication services can include, but are not limited to, telephony service, email, IM (instant messaging), and the like. Communication servers 110 can manage these communication services and therefore receive data regarding communication history and habits. Communication servers 110 can convey such data to communication server modules 122 to be used with contact history engine 124 and stored on data store 128. The modules 122 can be specific modules designed to handle a format and protocol of messages conveyed from a specific communication server 110.

The communication client 130 can be any computing device capable of utilizing a communication service, such as those provided by communication servers 110. Communication client 130 can have contact update engine 132 embedded for managing contact information and for handling communications with contact management server 120. Communication client 130 can also present information update interface 102 to a user and allow the user to input new contact information. Examples of client 130 can including, but are not limited to, a desktop computer, a mobile phone, a personal data assistant (PDA), a laptop computer, or the like.

Contact management server 120 can be any computing device or set of computing devices capable of managing contact information as described herein. Contact management server 120 can include communication server modules 122, contact history engine 124, contact management engine 126, recipient list generator 127, message conveyer 129, and data store 128. Each of the components 122, 124, 126, 127, and 129 can be implemented in combinations of software, firmware, and hardware. In one embodiment, the contact management server 120 can be implemented as middleware. Functions provided by the contact management server 120 can also be provided as a Web service or as a Service Oriented Architecture (SOA) compliant application. As previously noted, in other contemplated embodiments, functions ascribed to the server 120 can be performed by client 130 and/or by a communication server 110.

The contact history engine 124 can receive data from communication servers 110 and store the data in a usable format for contact management engine 126. Contact history engine 124 can combine the data retrieved from each communication server 110 and determine contact metrics for each contact. In one embodiment, the contact history engine 124 can be configured to decipher a set of communicators participating in group communication. For example, an email conveyed to "employees" can be interpreted as an email message to each individual member of an employee group. Accounting for grouped communications ensures that important contacts typically receiving communications under "blanket" communications are not necessarily excluded from the recipient list created by the generator 127.

Contact management engine 126 can be used to maintain contact information for one or more clients 130 and/or one or more communication servers 110. In one embodiment, the contact management engine 126 can combine contact information from contact lists 136 maintained within a multitude of different client 130 devices to centrally manage this information. Contact management engine 126 can interact with recipient list generator 127 to grant preferential treatment to those individuals included in a contact list compared to communicators identified from the contact metrics who are not included in a contact list. In one embodiment, the contact management engine 126 can partially expose a contact list of communication recipients to a user of client 130, which can be used as a weighted indicator to determine whether a recipient should be included in the user's recipient list. In one embodiment, the contact management engine 126 can be integrated into one or more additional software systems, such as a calendaring system, to determine a presence or absence of a recipient and/or communicator within that software system. This presence or absence can also be a factor used to determine an appropriateness of including a recipient in a recipient list.

The recipient list generator 127 can apply a set of configurable programmatic rules based at least in part upon contact metrics. These programmatic rules can be of any arbitrary complexity so long as a computing device can follow the rules to make a determination concerning whether a user is to be included or excluded from a recipient list. A series of weighed values can be applied based on a myriad of factors, such as communication frequency, communication type, communication duration, presence in a contact list 136, a known relationship between the recipient and a user, and the like. In one embodiment, a set of user configurable thresholds can be established that affect the programmatic rules. For example, a user can establish a threshold (or rule) to include those contacts with whom a user has participated with a telephone call of over thirty minutes in the last month.

The message conveyor 129 can be configured to initialize, to send, or to facilitate a sending of a notification to each of the recipients of a generated recipient list. The message conveyor 129 can utilize one or more different communication types to send this notification. In one embodiment, for example, the message conveyer 129 can convey a message about an update in a predominant communication format used by each individual recipient of a recipient list. For instance, a recipient that typically communicates using email will be sent an email message by conveyor 129; a recipient who typically communicates using postal mail will be sent a postal mail message; and the like. Conveyor 129 can be programmatically linked to email servers, to IM servers, to fax machines, to automated voice dialers, to company databases (through which intranet notices can be conveyed or through which message can be posted to an intranet site), to automated mailing systems, and the like.

Network 150 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 150 can include local components and data pathways necessary for communications to be exchanged among computing device components and between integrated device components and peripheral devices. The network 150 can also include network equipment, such as routers, data lines, hubs, and intermediary servers which together form a packet-based network, such as the Internet or an intranet. The network 150 can further include circuit-based communication components and mobile communication components, such as telephony switches, modems, cellular communication towers, and the like. The network 150 can include line based and/or wireless communication pathways.

Data stores 112, 128, and 134 can be physically implemented within any type of hardware including, but not limited to, a magnetic disk, an optical disk, a semiconductor memory, a digitally encoded plastic memory, a holographic memory, or any other recording medium. The data stores 112, 128, and 134 can be a stand-alone storage units as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

FIG. 2 is a diagram of a set of interfaces for managing contact metrics for propagating contact changes to known contacts in accordance with an embodiment of the inventive arrangements disclosed herein. Specifically, FIG. 2 shows a recipient list update interface 202, a communication frequency details interface 220, and a recipient determination configuration interface 240. The interface of FIG. 2 can be utilized in a context of a system 100. The scope of the invention is not to be construed as limited to controls, arrangements, circumstances, or other implementation choices illustrated in FIG. 2. For example, although graphical user interfaces (GUIs) are shown in FIG. 2, the concepts expressed therein can be adapted for a voice user interface (VUI), a multimodal interface, a text only interface, a constrained interface of a mobile computing device, and the like. Further, the text boxes, menus, toolbars, pop-ups, and the like shown can be implemented as different control types designed to perform a similar purpose as those illustrated.

Recipient list update interface 202 can be an interface within which a recipient list is presented. In one embodiment, the interface 202 can permit editing the recipient list before a contact update message is sent to the recipients in the list. As shown, interface 202 can include the fields contact 204, communication frequency 206, and action 208. Contact 204 can show the name of each contact. Communication frequency 206 can include a button to bring up an interface such as communication frequency details interface 220. These details can show specifics of communications involving a related contact and a user of the interface. Action 208 can allow the specification of which action to take for each contact. For example, a user can select "Update," "Delete," or "Ignore" for each user. If update is selected, a notification can be sent to the contact. If delete is selected, the contact management engine can delete the contact from the recipient list and from a user's contact list as well. If ignore is selected, the contact can remain in a contact list, but be removed from the recipient list.

Communication frequency details interface 220 can display information regarding the contact history of a certain contact. For example, contact 222 can display the contact's name. Last communicated 224 can show the last communication with the contact. Total incoming communications 226 can show the total number of times the contact has contacted the user. Total outgoing communications 228 can show the total number of times the user has contacted the contact. As illustrated, communication frequency details interface 220 is an example of a presentation of contact history and/or contact metric data. In different embodiments, communication frequency details interface 220 can display any information that can help a user decide which action to take for the contact. For example, in some embodiments, communication frequency details interface 220 can present graphs, charts, and other visual aids to show communication history with the contact.

Recipient determination configuration interface 240 can be an interface to allow a user to configure behaviors for adding or excluding recipients from an automatically generated recipient list. Interface 240 can include options 242, 244, and 246. Option 242, as read, can allow a user to set a threshold for automatically marking a contact for deletion if there hasn't been a communication with the contact via a configurable medium over a configurable period of time. Option 242 shows a control drop-down menu to specify which medium to set the option for (currently set to any communication medium).

Option 242 also shows drop-down menus to specify a range of time for the option (currently set to 30 days). This range of time can be configured for any range of time, including seconds, minutes, hours, days, months, years, or the like. Option 244 is similar to option 242, in that it specifies contacts should automatically be marked for deletion; however option 244 can specify the length of time if the user hasn't contacted the contact in the configured time. Option 246 can be an option similar to options 244 and 242, but option 246 can specify contacts to automatically mark for update if there has been a communication within the configured range. It is contemplated that in certain embodiments, contact update configuration interface 240 can include any number of options or settings to modify the behavior of the contact management engine. For example, contact update configuration interface 240 can include options for automatically marking contacts to any option based on contact metrics regarding frequency in which the user has contacted the contact, frequency in which the contact has contacted the user, the last medium communication has occurred over, or the like.

Figure 3:
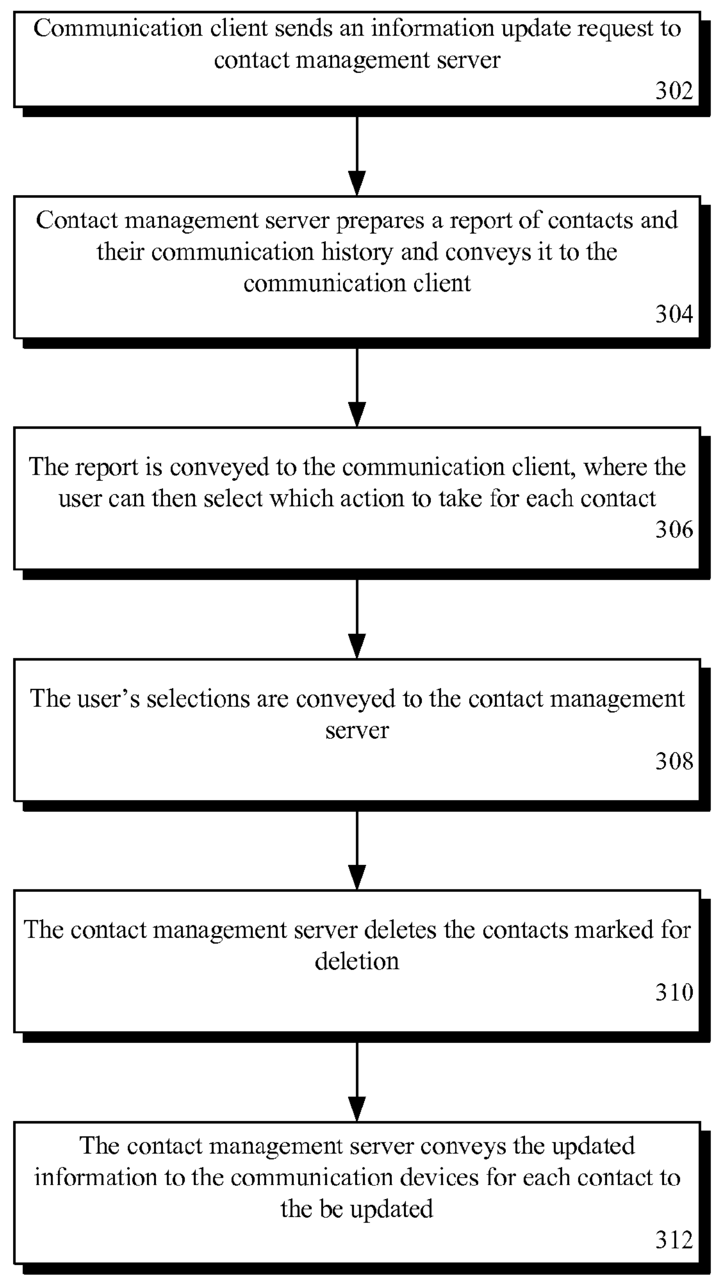
FIG. 3 is a flow chart of a method for propagating contact updates to an automatically generated recipient list in accordance with an embodiment of the inventive arrangements disclosed herein.

FIG. 3 is a flow chart of a method 300 for propagating contact updates to an automatically generated recipient list in accordance with an embodiment of the inventive arrangements disclosed herein. Method 300 can be performed in context of system 100 and/or can utilize any of the interfaces and concepts expressed within interfaces of FIG. 2.

Method 300 can begin in step 302, where a communication client can send an information update request to the contact management server. In step 304, the contact management server can prepare a report of contacts and their communication history and conveys it to the communication client. In this step, the contact management server can use contact metrics to attempt to automatically identify each contact to be updated or deleted. In step 306, the report can be conveyed to the communication client and the user can review the report and select which action to perform for each contact. In step 308, the user's selections can be conveyed to the contact management server. In step 310, the contact management server can delete contacts in accordance with the user's selections. In step 312, the contact management server can notify each of the known contact's communication devices of the updated information.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining parties who are to receive contact updates comprising:

identifying a change in contact information for a communicator;

acquiring contact metrics for the communicator, wherein said contact metrics detail historic person-to-person communication instances between said communicator and at least one party;

applying at least one previously established programmatic rule to the acquired contact metric to automatically determine whether each of the at least one party is a recipient who should be notified of the change in contact information based upon comparing the contact metrics relating to that party and the communicator against at least one previously established threshold; and selectively adding recipients to a recipient list based upon results of the applied programmatic rule configured to prefer including individuals in the contact list to the recipient list compared to including individuals not in the contact list to the recipient list, wherein said recipient list represents a listing of parties who are to be notified of the change in contact information.

2. The method of claim 1 further comprising:

constructing at least one message addressed to each recipient in the recipient list, wherein the message is addressed using a recipient specific address suitable for a type of communication through which the message is to be conveyed, whereby the types of communication comprise email communication, instant messaging communication, phone communication, fax communication, and postal mail communications.

3. The method of claim 1, further comprising:

automatically initiating at least one of an email message, a text message, an instant message, a postal message, and a fax message communication, which is automatically addressed to each recipient on the recipient list.

4. The method of claim 1, wherein the contact metrics comprise metrics concerning a plurality of different types of communications, wherein each different type of communication is associated with a different recipient contact identifier.

5. The method of claim 4, further comprising:

analyzing the contact metrics to determine a primary communication type used by each recipient of the recipient list to communicate with the communicator;

including an indicator of the primary communication type and a recipient contact identifier for the primary communication type for each recipient in the contact list.

6. The method of claim 1, further comprising:

identifying a contact list of the communicator; and selectively removing individuals from the contact list based upon results of the applied programmatic rule, wherein individuals are removed from the contact list when no communication has occurred between that individual and the communicator within a defined period of time, wherein the recipient list comprises all of the individuals of the contact list, who have not been selectively removed based upon results of the applied programmatic rule.

7. The method of claim 1, wherein one of the least one previously established threshold is a threshold configurable by the communicator.

8. The method of claim 1, wherein the programmatic rules are configured to prefer including recipients to the recipients list of the communicator when the recipient includes the communicator in a recipient's contact list.

9. The method of claim 1, wherein the programmatic rules are configured to prefer including recipients to the recipients list of the communicator when the recipient is included in a calendar of the communicator or when the communicator is included in a calendar of the recipient.

10. The method of claim 1, further comprising:

identifying a blocked list of the communicator; and excluding individuals in the blocked list from being included as a recipient of the recipient list.

11. A computer program product for designating staff of a meeting, the computer program product comprising:

a computer usable storage medium, which is a non-transitory, physical storage medium, having computer usable program code embodied therewith, the computer usable program code comprising:

computer usable code configured to identify a change in contact information for a communicator;

computer usable code configured to acquiring contact metrics for the communicator, wherein said contact metrics detail historic person-to-person communication instances between said communicator and at least one party;

computer usable code configured to apply at least one previously established programmatic rule to the acquired contact metric to automatically determine whether each of the at least one party is a recipient who should be notified of the change in contact information based upon comparing the contact metrics relating to that party and the communicator against at least one previously established threshold; and computer usable code configured to selectively add recipients to a recipient list based upon results of the applied programmatic rule configured to prefer including individuals in the contact list to the recipient list compared to including individuals not in the contact list to the recipient list, wherein said recipient list represents a listing of parties who are to be notified of the change in contact information.

12. The computer program product of claim 11, the computer usable program code of the computer usable storage medium further comprising:

computer usable code configured to construct at least one message addressed to each recipient in the recipient list, wherein the message is addressed using a recipient specific address suitable for a type of communication through which the message is to be conveyed, whereby the types of communication comprise email communication, instant messaging communication, phone communication, fax communication, and postal mail communications.

13. The computer program product of claim 11, the computer usable program code of the computer usable storage medium further comprising:

computer usable code configured to automatically initiate at least one of an email message, a text message, an instant message, a postal message, and a fax message communication, which is automatically addressed to each recipient on the recipient list.

14. The computer program product of claim 11, wherein the contact metrics comprise metrics concerning a plurality of different types of communications, wherein each different type of communication is associated with a different recipient contact identifier, said computer usable program code of the computer usable storage medium further comprising:

computer usable code configured to analyze the contact metrics to determine a primary communication type used by each recipient of the recipient list to communicate with the communicator; and computer usable code configured to including an indicator of the primary communication type and a recipient contact identifier for the primary communication type for each recipient in the contact list.

15. A system comprising hardware for propagating contact updates comprising;

a history data store, comprising a non-transitory storage medium, configured to store communication history information for a user; and a recipient list generator, comprising software executable by a processor, configured to automatically generate a list of recipients who are to receive a notification when a change to contact information for the user occurs, wherein the recipient list generator is configured to determine which recipients are to be included in the recipient list based upon the communication history information and configured to prefer including individuals in the contact list to the recipient list compared to including individuals not in the contact list to the recipient list.

16. The system of claim 15, further comprising:

a contact list data store, comprising a non-transitory storage medium, configured to maintain a contact list for the user, wherein the recipient list generator is configured to exclude individuals in the contact list from the recipient list whenever the excluded individual has failed to communicate with the user within a previously established time period as determined from the communication history information.

17. The system of claim 15, further comprising:

a message conveyer, comprising software executable by a processor, configured to initiate at least one message automatically addressed to each of the recipients in the recipient list, wherein said at least one message is intended to be utilized to convey the change to contact information for the user.

18. The system of claim 15, wherein the history data store and the recipient list generator are components of a mobile communication device, wherein said history data store comprises details for inbound communications, outbound communications, and missed communications, said mobile communication device comprising:

a user interface for changing contact information of the user; and a history scanning component configured to scan the inbound, outbound, and missed communications to build a communicator listing for unique communicators interacting with the mobile communication device within a designated period of time, wherein the communicator listing comprises at least one contact number or address for each of the unique communicators derived from the communication history information, wherein said recipient list generator filters the communicator listing to generate the list of recipients, wherein communicators on the communicator listing are excluded from the list of recipients in the recipient list when a communication frequency with the mobile communication device determined from the communication history information is below a previously established threshold.

19. The system of claim 18, said mobile communication device further comprising:

a small messaging service (SMS) based communication component configured to create a SMS formatted message and to send the SMS formatted message to each recipient in the list, wherein said SMS formatted message indicates that contact information for the user has changed and provides current contact information for the user.

* * * * *